United States Patent
Kimura et al.

(10) Patent No.: US 6,943,974 B2
(45) Date of Patent: Sep. 13, 2005

(54) STORAGE DEVICE, PROGRAM FOR CONTROLLING STORAGE DEVICE, METHOD FOR CONTROLLING STORAGE DEVICE AND RECORDING MEDIUM

(75) Inventors: Tomoaki Kimura, Fujisawa (JP); Satoshi Tohji, Yamato (JP); Eiji Ogura, Isogo-ku (JP); Kazuhiro Tsuruta, Sagamihara (JP); Kenji Nakamura, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 29 days.

(21) Appl. No.: 10/689,263

(22) Filed: Oct. 20, 2003

(65) Prior Publication Data

US 2004/0080849 A1 Apr. 29, 2004

(30) Foreign Application Priority Data

Oct. 29, 2002 (JP) .................................... 2002-314140

(51) Int. Cl.$^7$ ................................................ G11B 5/09
(52) U.S. Cl. ............................ 360/53; 360/31; 360/48; 360/77.11; 360/77.12; 360/50
(58) Field of Search ............................ 360/31, 48, 50, 360/55, 53, 77.1, 77.12, 77.11

(56) References Cited

U.S. PATENT DOCUMENTS

| | | | | |
|---|---|---|---|---|
| 6,111,708 A | * | 8/2000 | Jewell et al. | 360/31 |
| 6,292,445 B1 | * | 9/2001 | Ito et al. | 369/47.14 |
| 6,384,997 B1 | * | 5/2002 | Wu et al. | 360/46 |
| 2003/0237024 A1 | * | 12/2003 | Ogawa et al. | 714/29 |
| 2004/0001408 A1 | * | 1/2004 | Propps et al. | 369/53.17 |

* cited by examiner

*Primary Examiner*—David Hudspeth
*Assistant Examiner*—Dismery Mercedes
(74) *Attorney, Agent, or Firm*—John C. Kennel; Dillon & Yudell LLP

(57) ABSTRACT

A method and system for rewriting data on a tape when an error occurs during an initial write operation. When the initial write error occurs, the data is rewritten at a location that is a pre-defined block gap distance from the last valid write location on the tape. By measuring the length of the pre-defined block gap distance, the cause or causes of the write error or errors are known. Thus, the pre-defined block gap not only ensures that the data is not re-written in a no-write zone of the tape, due to the zone known to be error prone, but a historical record of past write errors is logged based on the length of the block gaps.

18 Claims, 6 Drawing Sheets

230

| ERROR INFORMATION | BLOCK GAP SET VALUE |
|---|---|
| SERVO ERROR A | 23 |
| SERVO ERROR B | 31 |
| SERVO ERROR C | 17 |
| ⋮ | ⋮ |

STORAGE DEVICE, PROGRAM FOR CONTROLLING STORAGE DEVICE, METHOD FOR CONTROLLING STORAGE DEVICE AND RECORDING MEDIUM

This application claims the priority of Japanese Application Patent No. 2002-314140, filed on Oct. 29, 2002, and entitled "Storage Device, Program for Controlling Storage Device, Method for Controlling Storage Device and Recording Medium."

BACKGROUND OF THE INVENTION

1. Technical Field

The present invention relates to a storage device, a program for controlling the storage device, a method for controlling the storage device, and a recording medium. Particularly, the present invention relates to a storage device for recording additional data in association with data to be recorded when the data to be recorded is divided into multiple blocks and recorded on a recording medium, a program for controlling the storage device, a method for controlling the storage device, and a recording medium.

2. Description of the Related Art

The LTO (Linear Tape Open) standard has been established as a standard for enhanced magnetic tapes. The LTO standard, "LTO (Linear Tape-Open), published by Hewlett-Packard Company, International Business Machines Corporation, Seagate Technology Incorporated and located on the Internet at http://www.lto-technology.com/, is hereby incorporated by reference in its entirety. In the LTO standard, when an error has occurred in writing onto a magnetic tape, data on which the error has occurred can be rewritten by providing a predetermined space to skip a place where the error has occurred.

However, the prior art requires that information regarding read/write errors be appended to the data being written, thus changing the original data. What is needed, therefore, is a method and system for describing read/write errors that does not change the data being read/written.

SUMMARY OF THE INVENTION

Accordingly, it is an object of the present invention to provide a storage device, a program for controlling the storage device, a method for controlling the storage device and a recording medium that can solve the above-mentioned problem. The object is achieved by a combination of features described in the independent claims. The dependent claims specify more advantageous embodiments of the present invention.

According to a first aspect of the present invention, there is provided a storage device in which data to be written is divided into multiple blocks and recorded on a recording medium. The storage device includes an error detecting section for detecting a write error on the recording medium and acquiring error information indicating the contents of the error, a recording position determining section for determining recording positions on the recording medium where the blocks produced by dividing the data to be written are respectively written, based on the detected error information, and a block writing section for writing the respective blocks to the recording positions on the recording medium determined by the recording position determining section; a control method for controlling the storage device; a program for controlling the storage device; a recording medium on which the program is recorded; and a recording medium on which recording has been performed by the storage device.

Furthermore, according to a second aspect of the present invention, there is provided a storage device for reading data to be read, which is divided into multiple blocks and recorded on a recording medium. The storage device includes an error information storing section for storing error information indicating the contents of a write error on the recording medium in association with recording positions of the multiple blocks, a block reading section for reading the multiple blocks from the recording medium, a recording position acquiring section for acquiring the recording positions on the recording medium where the multiple blocks are respectively recorded, and an error information outputting section for selecting from the error information storing section and outputting the error information associated with the recording positions; a control method for controlling the storage device; a program for controlling the storage device; and a recording medium on which the program is recorded.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, where:

DETAILED DESCRIPTION OF THE PREFERRED EMBODIMENT

The present invention is now described with reference to its embodiments. It should be noted, however, that the embodiments do not limit the scope of the invention defined by the claims, and all the combinations of features described in the embodiments are not necessarily essential for the invention to solve the problem.

Figure 1:
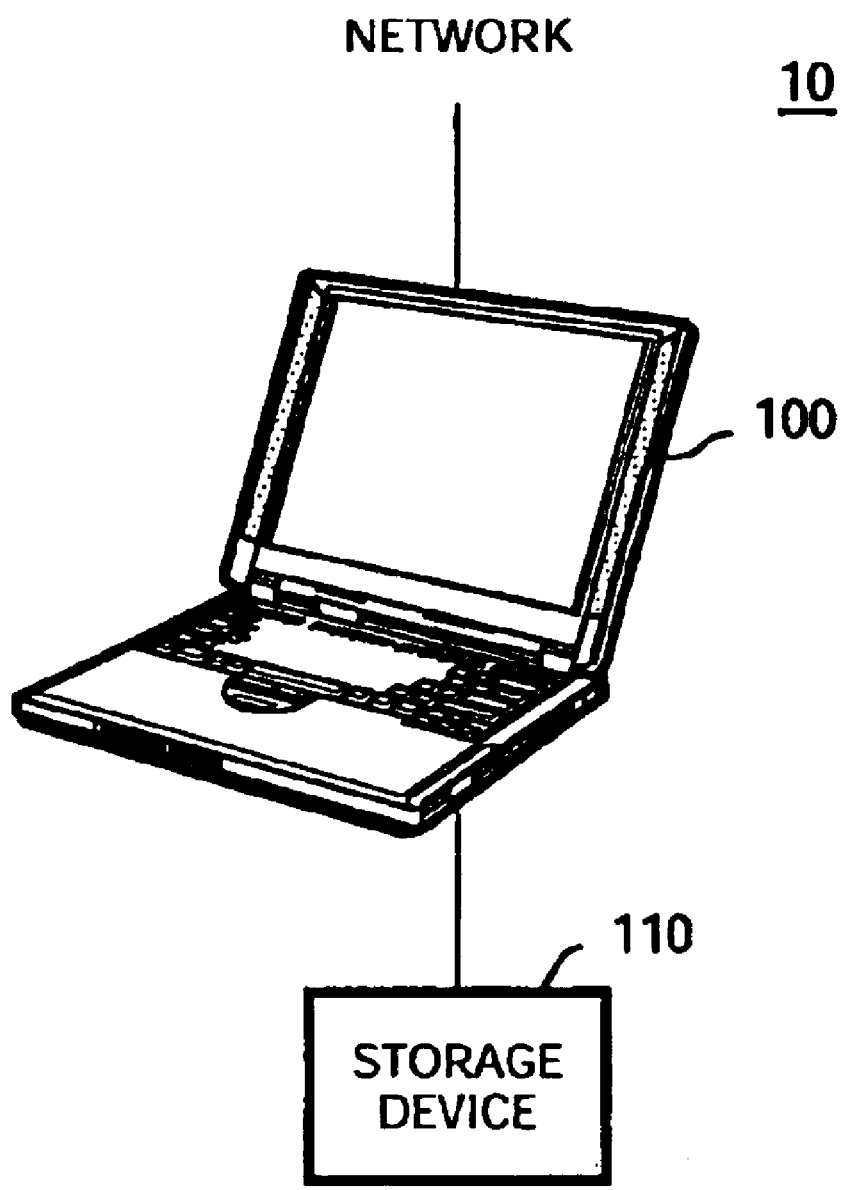
FIG. 1 is a functional block diagram of a storage system 10.

FIG. 1 is a functional block diagram of a storage system 10. The storage system 10 is provided with an information processing device 100 and a storage device 110. The information processing device 100 sends data to be stored in the storage device 110 to the storage device 110, in response to a user input, an instruction from an application program, or an external instruction via a network. The storage device 110 divides the data to be written thereto, which has been received from the information processing device 100, into multiple blocks and records them on a recording medium such as a magnetic tape. If an error occurs in writing of a block, the storage device 110 determines a rewriting position for the block, that is, size of a block gap to be provided between blocks which should be continuously written, depending on the contents of the error, which preferably includes a description and location of the error. The storage device 110 also reads blocks from the recording medium and returns them to the information processing device 100 in response to a read instruction from the information processing device 100. At that time, the storage device 110 can properly identify and output the contents of an error, which occurred in writing of the read block, by analyzing the recording position of the block on the recording medium.

Figure 2:
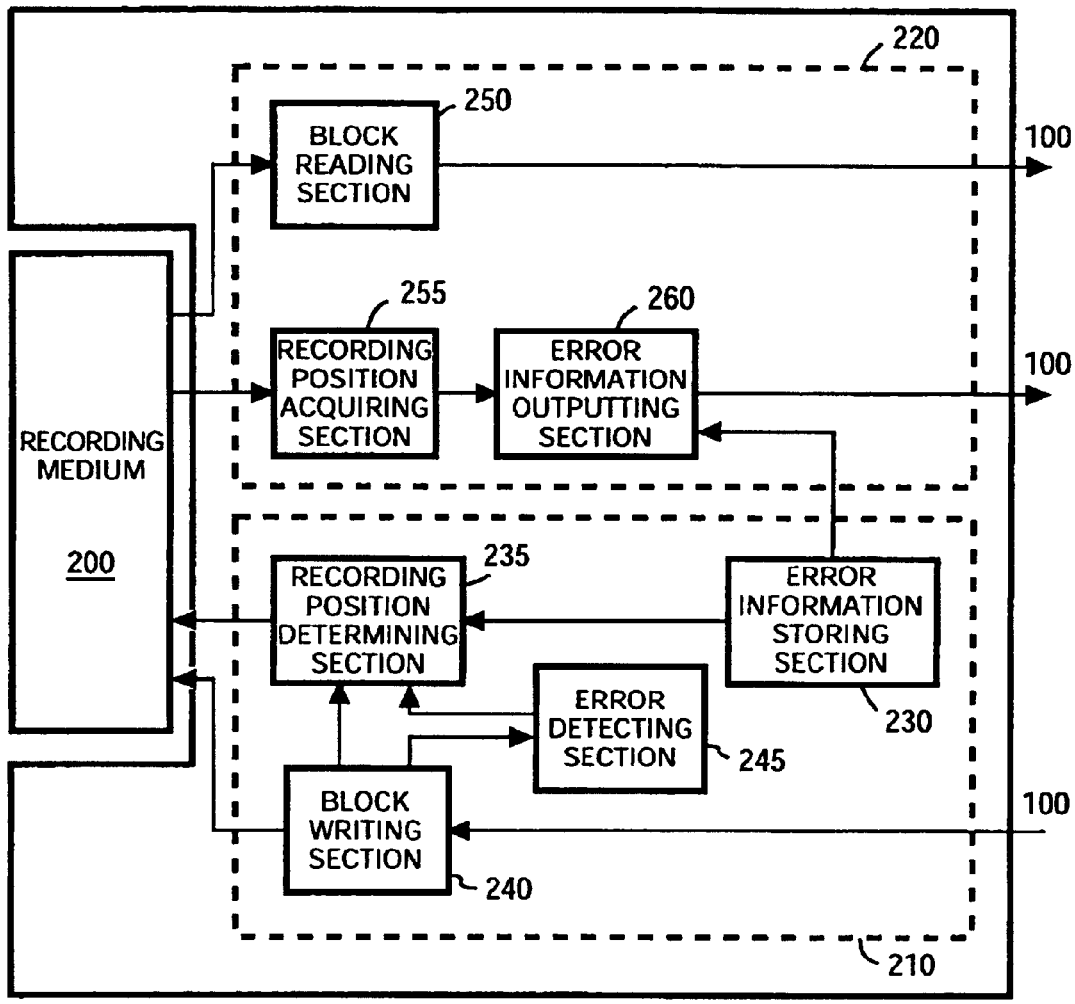
FIG. 2 is a functional block diagram of a storage device 110.

FIG. 2 is a functional block diagram of the storage device 110. The storage device 110 is provided with a recording medium 200, a write-control section 210 and a read-control section 220.

Multiple blocks produced by dividing data to be written are recorded on the recording medium 200. A magnetic tape in accordance with the LTO (Linear Tape-Open) standard, for example, is used as the recording medium 200 according to the embodiment. Alternatively, another recording medium, such as a magnetic disk, an optical disk, a magneto-optical disk, or a semiconductor memory, may also be used as the recording medium 200.

The write-control section 210 receives a write request and data to be written from the information processing device 100 and writes the data to be written on the recording medium 200. The write-control section 210 comprises an error information storing section 230, a recording position determining section 235, a block writing section 240 and an error detecting section 245.

The error information storing section 230 stores multiple set values, which are different from one another and to be set as recording positions, in association with the respective error information, which preferably includes a description of the error type as well as the error location. The write-control section 210 sends the set values or error information to the recording position determining section 235 and an error information outputting section 260, as necessary.

The recording position determining section 235 determines, based on a predefined rule, recording positions on the recording medium 200 where the blocks produced by dividing the data to be written should be respectively written if no error information is received from the error detecting section 245. For example, when the recording medium 200 is a magnetic tape, the recording position determining section 235 determines recording positions for the respective blocks so that the blocks are continuously located on the magnetic tape.

On the contrary, if the error information is received from the error detecting section 245, the recording position determining section 235 determines recording positions on the recording medium 200 where the blocks should be respectively written, based on the set values which are acquired from the error information storing section 230 depending on the error information.

The block writing section 240, by dividing the data to be written into multiple blocks and causing the recording position determining section 235 to specify recording positions where the blocks should be respectively written, writes the respective blocks to the recording positions on the recording medium determined by the recording position determining section 235. When an error has occurred in writing onto the recording medium, the block writing section 240 notifies the error detecting section 245 of that occurrence.

The error detecting section 245, if detecting an error in writing onto the recording medium by receiving from the block writing section 240 a notification that an error has occurred, acquires error information indicating the contents of the error from the block writing section 240 and sends it to the recording position determining section 235.

The read-control section 220, in response to a read request from the information processing device 100, reads data to be read, which was divided into multiple blocks and stored in the recording medium 200. The read-control section 220 comprises a block reading section 250, a recording position acquiring section 255 and an error information outputting section 260.

The block reading section 250 reads multiple blocks from the recording medium 200. The block reading section 250 then puts the read blocks together to compose data to be read, and sends it to the information processing device 100.

The recording position acquiring section 255 acquires recording positions on the recording medium 200 where the respective blocks are recorded and sends them to the error information outputting section 260. In this case, the recording position acquiring section 255 may acquire from the block reading section 250 the recording positions specified by the block reading section 250 to read the respective blocks.

The error information outputting section 260 receives from the recording position acquiring section 255 multiple recording positions corresponding to the respective blocks. The error information outputting section 260 selects error information corresponding to each of the recording positions from the error information storing section 230, and outputs it to the information processing device 100. For example, the error information outputting section 260 may output error information to the information processing device 100 at each time the error information is selected, or when a request to send error information is received.

In this way, the storage device 110 can embed error information indicating the contents of a write error into the recording medium 200 as a recording position of a block where the write error has occurred. Accordingly, whenever a write error has occurred, the storage device 110 can record information indicating the contents of the write error without changing original data to be written.

Thus, the storage device 110 can properly output data written onto the recording medium 200 and also output the contents of an error, which has occurred in writing onto the recording medium 200, based on a block recording position. Thus, an administrator or a developer of the recording medium 200 and the storage device 110 can analyze the cause of an error and prevent an error from occurring.

Figures 3, 5:
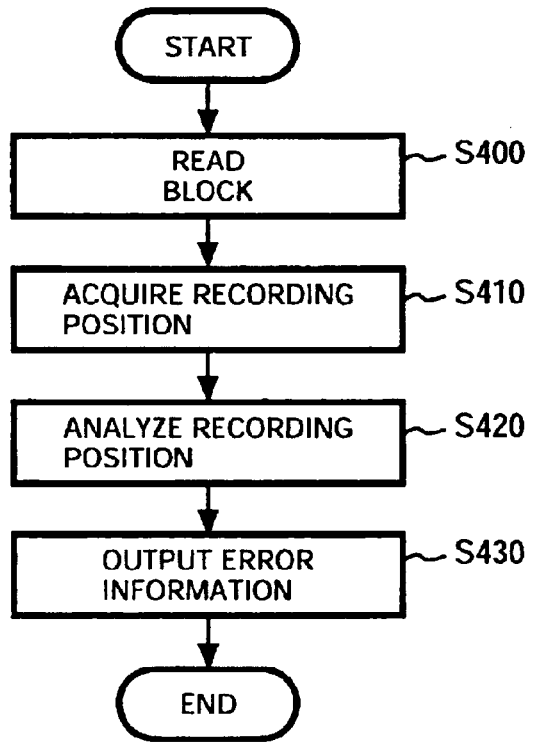
FIG. 3 shows particulars of an error information storing section 230.
FIG. 5 is an operational flowchart of a read-control section 220 in the storage device 110.

FIG. 3 shows particulars of the error information storing section 230. The error information storing section 230 stores multiple block gap set values different from one another in association with error information indicating the contents of errors. For example, the error information storing section 230 stores 23, 31 and 17 in association with a servo error A, a servo error B, and a servo error C, respectively. The error information storing section 230 may store information indicating that a servo is deviated from its course, information indicating that a servo is deviated from its position, and information indicating that when data is read and checked, the read data is different from the one which should have been written.

When a single error has occurred in a block, the error information outputting section 260 can select and output the contents of the error occurred in the block because the block gap set values differ depending on error information. However, when multiple errors are detected in writing a block, the recording position determining section 235 should calculate the total of block gap set values associated with the respective errors as a block gap. Accordingly, it is necessary to set the block gap set values so that it can be recognized how many times each of the errors has occurred based on the total.

Accordingly, the error information storing section 230 stores multiple block gap set values which are relatively prime to each other (prime numbers, for example), each of which is associated with error information, as shown in the figure. This allows the error information outputting section 260 to analyze and output how many times what error has occurred when the total of the block gap set values is below a predetermined value. For example, if the total of block gap set values is below 391 (23×17), it is possible to eliminate the possibility that whether the servo error A has occurred seventeen times or the servo error C has occurred twenty three times cannot be distinguished. In other words, the error information storing section 230 can analyze and output how many times what error has occurred for each error which has occurred a predetermined number of times or less (sixteen times or less, for example).

Here, a maximum distance from a position on the recording medium 200 where a block writing was attempted resulting in an error to a position on the recording medium 200 where rewriting of the block is permitted may be predetermined in the storage device 110. In this case, the error information storing section 230 stores multiple block gap set values with any two values thereof, when multiplied, producing a distance which exceeds the maximum distance, so that the error information outputting section 260 can analyze and output how many times what error has occurred based on the total of the block gap set values. Though "block gap set values" in FIG. 3 are shown with no unit, actual block gap values are calculated by multiplying the set values by a predetermined unit distance.

Figure 4:
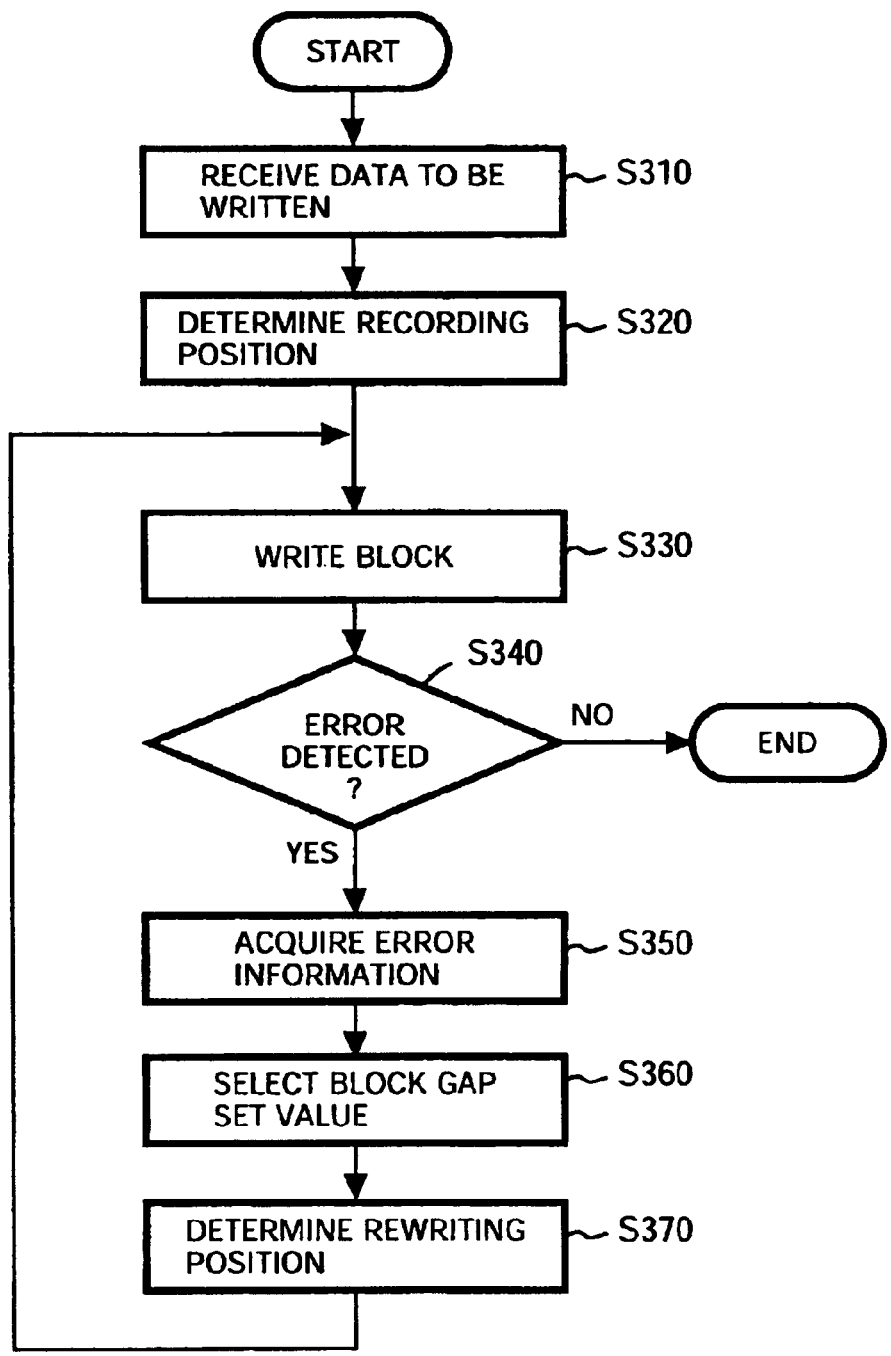
FIG. 4 is an operational flowchart of a write-control section 210 in the storage device 110.

FIG. 4 shows an operational flow of the write-control section 210 in the storage device 110. The block writing section 240 receives data to be written from the information processing device 100 and divides it into multiple blocks (S310). The recording position determining section 235 then determines recording positions on the recording medium 200 where the respective blocks divided by the block writing section 240 should be written (S320). The block writing section 240 writes the respective blocks on the recording positions on the recording medium determined by the recording position determining section 235 (S330).

If an error is detected in writing onto the recording medium performed by the block writing section 240 (YES at S340), the error detecting section 245 acquires error information indicating the contents of the error (S350). The recording position determining section 235 then selects a block gap set value from the error information storing section 230 based on the error information (S360). The recording position determining section 235 then determines a block gap indicated by the block gap set value as a gap between a block recorded before the error occurred and a position where a block in which the error has occurred is rewritten (S370), and the process returns to S330. If any error had already occurred in the same block, the block gap is calculated by summing block gap set values corresponding to the error, which had already occurred, and the error detected in S340 this time.

FIG. 5 shows an operational flow of the read-control section 220 in the storage device 110. When a read request is received from the information processing device 100, the block reading section 250 sequentially reads each of multiple blocks (S400) first. The recording position acquiring section 255 then sequentially acquires each of recording positions of the blocks read by the block reading section 250 (S410).

The error information outputting section 260 analyzes how many times each of the errors has occurred, based on the acquired recording position, that is, the total block gap calculated and embedded by the recording position acquiring section 255 when writing was performed (S420). For example, if the same error has occurred multiple times in the same block, the error information outputting section 260 can identify the contents of the error by analyzing what block gap set value stored in the error information storing section 230 has produced the total block gap by multiplication. The error information outputting section 260 can calculate the number of times the error has occurred by dividing the total block gap by the block gap set value.

The error information outputting section 260 outputs to the information processing device 100 each error information in association with the number of times the corresponding error has occurred (S430).

Through the reading process described above, the storage device 110 can sequentially extract and output error information which has been added in association with data to be written in the writing process.

Figure 6:
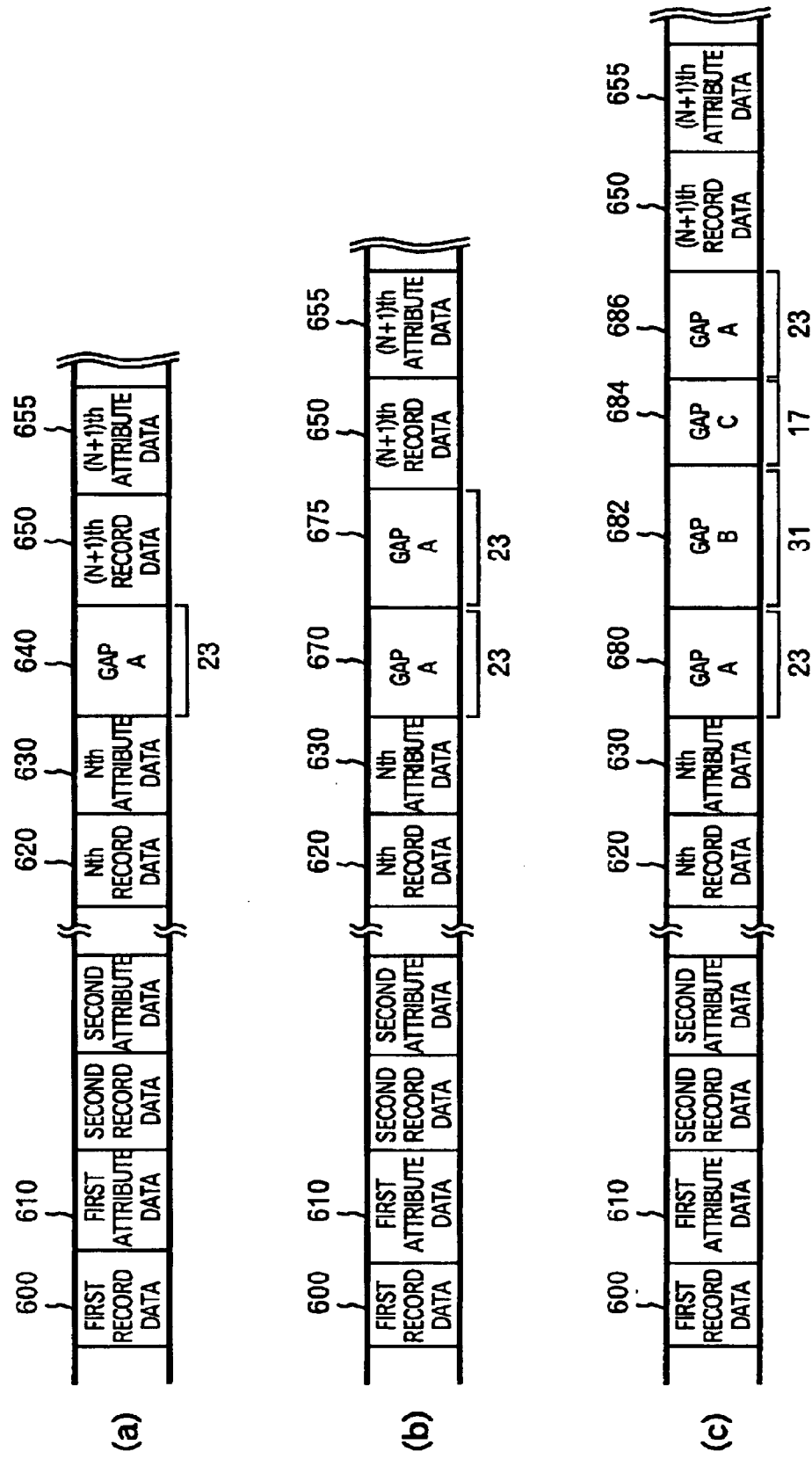
FIG. 6 shows a data recording format in the case where a recording medium 200 is a magnetic tape in accordance with the LTO standard.

FIG. 6 shows data recording formats in the case where the recording medium 200 is a magnetic tape in accordance with the LTO standard and the like. The reference numerals 600, 620 and 650 denote block recording areas for recording the respective blocks produced by dividing the data to be written. First attribute data 610, Nth attribute data 630 and (N+1)th attribute data 655 are information indicating attributes of the respective blocks, and are written in association with first record data 600, Nth record data 620 and (N+1)th record data 650, respectively. Gaps A 640, 670, 675, 680, 686, a gap B 682 and a gap C 684 are block gaps each of which is to be provided between adjacent blocks in the multiple blocks in a writing process.

FIG. 6(a) shows a recording format in the case where an error in writing onto a magnetic tape has been detected. When writing of the Nth record data 620 and the Nth attribute data 630 is completed, the block writing section 240 attempts to write the (N+1) record data 650 and the (N+1) attribute data 655 a place adjacent to the Nth attribute data 630 on the recording medium 200. When the error detecting section 245 detects a servo error A in the writing of the (N+1) record data 650 and the (N+1) attribute data 655, the block writing section 240 stops writing of the (N+1) record data 650 and the (N+1) attribute data 655. The recording position determining section 235 then selects "23" which is a block gap set value corresponding to the servo error A, and causes the gap A 640 to be provided to determine a rewriting position of the (N+1) record data 650 and the (N+1) attribute data 655. In other words, the block writing section 240 rewrites the (N+1) record data 650 and the (N+1) attribute data 655 after the gap A 640.

In this way, the recording position determining section 235 determines a recording position where the block in which the write error has occurred is to be rewritten, by providing the gap A 640, which is longer than a space which should have been required to write the block if the error had not occurred. Thus, the recording position determining section 235 can skip a place on the recording medium 200 where an error may have occurred to rewrite a block.

When data is read, the error information outputting section 260 can recognize and output that the servo error A has occurred in writing of the (N+1) record data 650 by analyzing the length of the gap A 640 located immediately before the (N+1) record data 650.

FIG. 6(b) shows a recording format in the case where the same write error has been detected multiple times on a magnetic tape. As in FIG. 6(a), the recording position determining section 235 causes the gap A 670 to be provided and causes the (N+1) record data 650 and the (N+1) attribute data 655 to be rewritten because a servo error A has been detected in writing of the (N+1)th record data 650 and the (N+1)th attribute data 655. If the servo error A occurs again in the rewriting, the recording position determining section 235 again causes the (N+1)th record data 650 and the (N+1)th attribute data 655 to be rewritten after the gap A 675 having the same length as the gap A 670. In this case, the error information outputting section 260 can also output that the servo error A has occurred twice in writing of the (N+1)th record data 650 by analyzing the total length of the gap 670 and the gap A 675 located just before the (N+1)th record data 650, that is, "46".

FIG. 6(c) shows a recording format in the case where multiple write errors have been detected on a magnetic tape. As in FIG. 6(a), the recording position determining section 235 causes the gap A 680 to be provided and causes the (N+1)th record data 650 and the (N+1)th attribute data 655 to be rewritten because a servo error A has been detected in writing of the (N+1)th record data 650 and the (N+1)th attribute data 655. If a servo error B occurs in the rewriting, the recording position determining section 235 causes the gap B 682 to be provided, and causes the (N+1)th record data 650 and the (N+1)th attribute data 655 to be rewritten after the gap B 682. Then, in the rewriting of the (N+1)th record data 650 and the (N+1)th attribute data 655, a servo error C and a servo error A sequentially occur, and after that, rewriting of the (N+1)th record data 650 and the (N+1)th attribute data 655 is completed. FIG. 6(c) shows the state in which the rewriting has been completed.

The error information outputting section 260 analyzes how many times each error has occurred, based on the total of the gap A 680, the gap B 682, the gap C 684 and the gap A 686 located just before the (N+1)th record data 650, that is, "94". For example, the error information outputting section 260 may calculate integer solutions of x, y and z to an equation in which the servo error A, the servo error B and the servo error C have occurred x times, y times and z times, respectively and the total is "94". Alternatively, in response to the calculated total, the error information outputting section 260 may select and output information indicating how many times each error has occurred, which is stored in advance in association with the total.

In this way, the error information storing section 230 sets multiple block gap set values so that the total becomes a different value if the number of times at least one of multiple errors has occurred is different from the others, so that the error information outputting section 260 can properly recognize and output how many times each of the errors has occurred.

Figure 7:
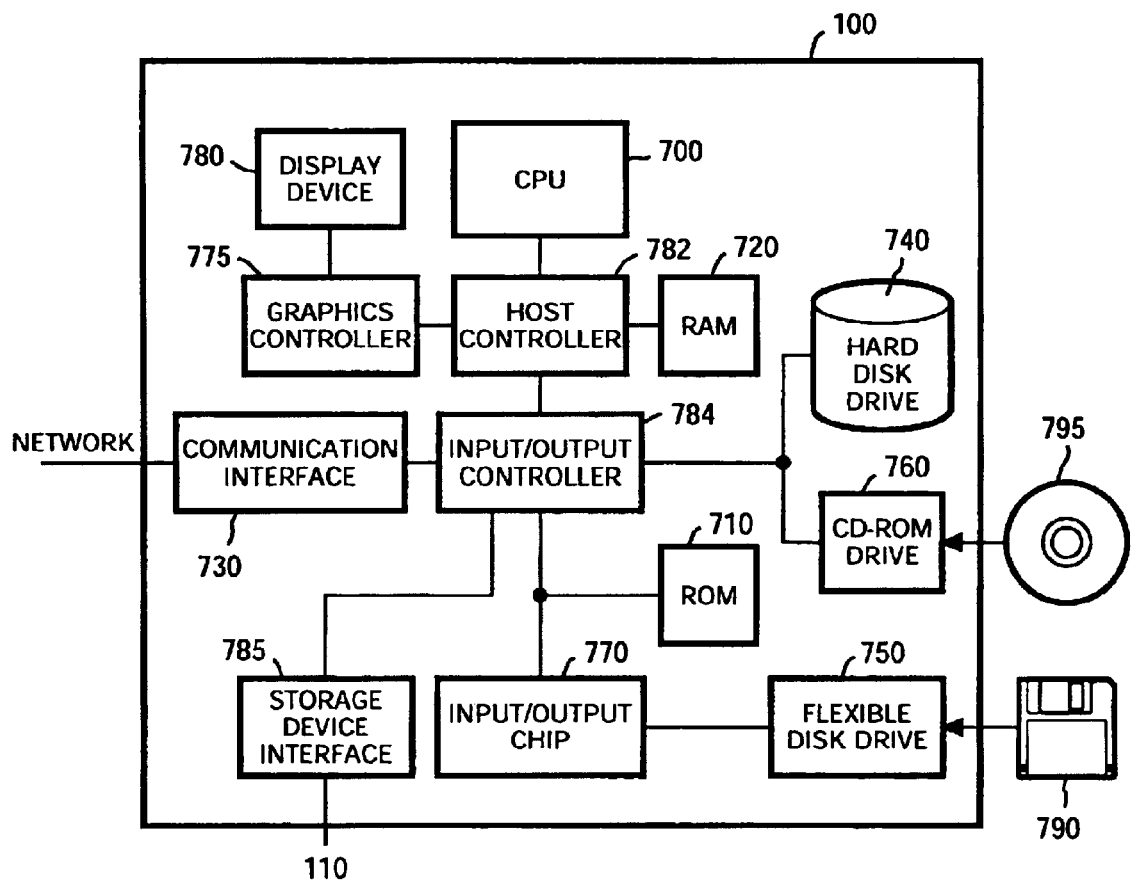
FIG. 7 shows an example of a hardware configuration of an information processing device 100.

FIG. 7 shows an example of a hardware configuration of the information processing device 100. The information precessing device 100 according to the embodiment comprises a CPU/peripheral part including a CPU 700, a RAM 720, a graphic controller 775 and a display device 780 which are mutually connected via a host controller 782; an input/output part including a communication interface 730, a hard disk drive 740, a CD-ROM drive 760 and a storage device interface 785 which are connected to the host controller 782 via an input/output controller 784; and a legacy input/output part including a ROM 710, a flexible disk drive 750 and an input/output chip 770 which are connected to the input/output controller 784.

The host controller 782 connects the RAM 720 with the CPU 700 and the graphic controller 775 which access the RAM 720 at a high transmission rate. The CPU 700 operates based on programs stored in the ROM 710 and the RAM 720 to control each part. The graphic controller 775 acquires image data that the CPU 700 generates in a frame buffer provided within the RAM 720 to display it on the display device 780. Alternatively, the graphic controller 775 may include therein the frame buffer for storing image data generated by the CPU 700.

The input/output controller 784 connects the host controller 782 with the communication interface 730, the hard disk drive 740, the CD-ROM drive 760 and the storage device interface 785 which are relatively high speed input/output devices. The communication interface 730 communicates with other devices via a network. The hard disk drive 740 stores programs and data to be used by the information processing device 100. The CD-ROM drive 760 reads a program or data from a CD-ROM 795 and provides it to the storage device interface 785 via the RAM 720 and the input/output controller 784. The input/output controller 784 accesses the storage device 110 based on a request received by the communication interface 730 from other information processing devices connected via the network.

The ROM 710 and relatively low speed input/output devices, such as the flexible disk drive 750 and the input/output chip 770, are connected to the input/output controller 784. The ROM 710 stores a boot program to be executed by the CPU 700 at a startup time of the information processing device 100, and hardware dependent programs for the information processing device 100. The flexible disk drive 750 reads a program or data from a flexible disk 790 and provides it to the storage device interface 785 via the RAM 720 and the input/output controller 784. The input/output chip 770 connects the flexible disk 790 and also connects various input/output devices via, for example, a parallel port, a serial port, a keyboard port, and a mouse port.

A program to be provided by a user to the storage device 110 via the storage device interface 785 is stored in a recording medium such as the flexible disk 790, the CD-ROM 795, or an IC card. The program is read from the recording medium, installed in the storage device 100 via the input/output controller 784 and the storage device interface 785, and executed in the storage device 110. Alternatively, the storage device 110 may further include a flexible disk drive, a CD-ROM drive or an IC card reader so that a program is directly read from a recording medium for execution or read from the recording medium 200 for installation.

Programs to be installed and executed in the storage device 110 include an error information storing module, a recording position determining module, a block writing module, a block reading module, a recording position acquiring module, an error information detecting module and an error information outputting module. Since the operations that the respective modules cause the storage device 110 to perform are the same as those of the corresponding members in the storage device 110 described with reference to FIGS. 1 to 6, the description thereof is omitted.

The programs and the modules described above may be stored in an external recording medium. As the recording medium, an optical recording medium such as a DVD or a PD, a magneto-optical recording medium such as an MD, a tape medium, a semiconductor memory such as an IC card, or other like medium may be used in addition to the flexible disk 790 and the CD-ROM 795. Furthermore, by using a storage device such as a hard disk or a RAM provided in a server system connected to a dedicated communication network or the Internet as a recording medium, a program may be provided to the storage device 110 via the network.

While the present invention has been described using the embodiments, the technical scope of the present invention is not limited to the scope described in the above embodiments. Various modifications or improvements may be made to the embodiments described above. It is apparent from the appended claims that the embodiments to which such modifications or improvements have been made should also be included in the technical scope of the present invention.

For example, if the recording medium 200 is a magnetic disk, an optical disk, or a magneto-optical disk, the recording position determining section 235 may determine recording positions such as tracks or sectors where the respective blocks are to be written, based on the error information.

As is apparent from the above description, if a write error has occurred, it is possible to record information indicating the contents of the error without changing the original data to be written according to the present invention.

What is claimed is:

1. A storage device for recording data, the data being divided into multiple blocks and recorded on a recording medium, the storage device comprising:
   an error detecting section for detecting a write error on the recording medium and acquiring error information about the write error;
   a recording position determining section for:
      defining a block gap on the recording medium, the block gap having a length determined by the error information about the write error, and
      determining a recording position on the recording medium for a subsequent write that is the block gap away from a last error free write operation; and
   a block writing section for writing a subsequent block of data to the recording position on the recording medium, wherein the length of the block gap provides both a no-write zone for subsequent writes as well as a description of the write error.

2. The storage device according to claim 1, wherein the recording medium is a magnetic tape.

3. The storage device according to claim 1, wherein the block gap is a length based on a prime number.

4. The storage device according to claim 3, wherein the recording position determining section further defines multiple said block gaps, wherein a product of the prime numbers indicates a maximum number of occurrences of a particular write error.

5. The storage device according to claim 1, wherein the block gap is larger than a normal storage space for one of the multiple blocks, such that a reading of a next block at a position that is farther from a previously written prior block than the normal storage space indicates a presence of the block gap, thus indicating a past write error.

6. The storage device according to claim 1, further comprising:
   an error information storing section for storing said error information in association with the recording positions of said multiple blocks;
   a block reading section for reading the multiple blocks from the recording medium;
   a recording position acquiring section for acquiring the recording positions on the recording medium where the respective blocks are recorded; and
   an error information outputting section for selecting and outputting error information associated with the recording positions from the error information storing section.

7. A method for recording data, the data being divided into multiple blocks and recorded on a recording medium, the method comprising:
   detecting a write error on the recording medium and acquiring error information about the write error;
   defining a block gap on the recording medium, the block gap having a length determined by the error information about the write error;
   determining a recording position on the recording medium for a subsequent write that is the block gap away from a last error free write operation; and
   writing a subsequent block of data to the recording position on the recording medium, wherein the length of the block gap provides both a no-write zone for subsequent writes as well as a description of the write error.

8. The method according to claim 7, wherein the recording medium is a magnetic tape.

9. The method according to claim 7, wherein the block gap is a length based on a prime number.

10. The method according to claim 9, further comprising defining multiple the block gaps, wherein a product of the prime numbers indicates a maximum number of occurrences of a particular write error.

11. The method according to claim 7, wherein the block gap is larger than a normal storage space for one of the multiple blocks, such that a reading of a next block at a position that is farther from a previously written prior block than the normal storage space indicates a presence of the block gap, thus indicating a past write error.

12. The method according to claim 7, further comprising:
   storing the error information in association with the recording positions of the multiple blocks;
   reading the multiple blocks from the recording medium;
   acquiring the recording positions on the recording medium where the respective blocks are recorded; and
   selecting and outputting error information associated with the recording positions from the error information storing section.

13. A computer readable medium encoded with a data structure, the data structure comprising:
   program code for detecting a write error on the recording medium and acquiring error information about the write error;
   program code for defining a block gap on the recording medium, the block gap having a length determined by the error information about the write error;
   program code for determining a recording position on the recording medium for a subsequent write that is the block gap away from a last error free write operation; and
   program code for writing a subsequent block of data to the recording position on the recording medium, wherein the length of the block gap provides both a no-write zone for subsequent writes as well as a description of the write error.

14. The computer readable medium according to claim 13, wherein the computer readable medium is a magnetic tape.

15. The computer readable medium according to claim 13, wherein the block gap is length based on a prime number.

16. The computer readable medium according to claim 15, wherein the data structure further comprises program code for defining multiple the block gaps, wherein a product of the prime numbers indicates a maximum number of occurrences of a particular write error.

17. The computer readable medium according to claim 13, wherein the block gap is larger than a normal storage space for one of the multiple blocks, such that a reading of a next block at a position that is farther from a previously written prior block than the normal storage space indicates a presence the block gap, thus indicating a past write error.

18. The computer readable medium according to claim 13, wherein the data structure further comprises:

program code for storing the error information in association with the recording positions of the multiple blocks;

program code for reading the multiple blocks from the recording medium;

program code for acquiring the recording positions on the recording medium where the respective blocks are recorded;

program code for selecting and outputting error information associated with the recording positions from the error information storing section.

* * * * *